(12) United States Patent
Lowe et al.

(10) Patent No.: US 10,736,075 B2
(45) Date of Patent: *Aug. 4, 2020

(54) RANGE-FINDING AND OBJECT-POSITIONING SYSTEMS AND METHODS USING SAME

(71) Applicant: ZEROKEY INC., Calgary (CA)

(72) Inventors: Matthew William Lowe, Calgary (CA); Vahid Dehghanian, Calgary (CA)

(73) Assignee: ZEROKEY INC., Calgary, Alberta ( * ) Notice: Subject to any disclaimer, the term of this patent is extended or adjusted under 35 U.S.C. 154(b) by 0 days.

This patent is subject to a terminal disclaimer.

(21) Appl. No.: 16/560,543

(22) Filed: Sep. 4, 2019

(65) Prior Publication Data

US 2020/0145957 A1 May 7, 2020

Related U.S. Application Data

(63) Continuation of application No. 16/031,553, filed on Jul. 10, 2018, now Pat. No. 10,448,357, which is a continuation of application No. 15/411,935, filed on Jan. 20, 2017, now Pat. No. 10,051,599.

(60) Provisional application No. 62/280,958, filed on Jan. 20, 2016.

(51) Int. Cl.
| | |
|---|---|
| *H04L 23/00* | (2006.01) |
| *H04W 64/00* | (2009.01) |
| *G01S 1/74* | (2006.01) |
| *G01S 11/16* | (2006.01) |
| *H04L 1/00* | (2006.01) |
| *H04L 5/00* | (2006.01) |

(Continued)

(52) U.S. Cl.
CPC ............ *H04W 64/006* (2013.01); *G01S 1/74* (2013.01); *G01S 5/30* (2013.01); *G01S 11/16* (2013.01); *H04L 1/0054* (2013.01); *H04L 5/0048* (2013.01); *G01S 1/80* (2013.01)

(58) Field of Classification Search
CPC .. H04W 64/006; H04L 1/0054; H04L 5/0048; G01C 1/206; G01S 5/0257; G01S 5/30; G01S 11/16; G01S 1/80; G01S 13/82; G08G 1/163
USPC ....... 375/295, 316, 377; 342/464; 455/456.6
See application file for complete search history.

(56) References Cited

U.S. PATENT DOCUMENTS

| | | | |
|---|---|---|---|
| 6,999,545 B2 * | 2/2006 | Karr | H04H 20/34 375/295 |
| 10,051,599 B2 * | 8/2018 | Lowe | H04L 5/0048 |

(Continued)

*Primary Examiner* — Phuong Phu
(74) *Attorney, Agent, or Firm* — Daniel Polonenko

(57) ABSTRACT

A range-finding and/or object-positioning system comprises one or more target devices; one or more reference devices communicating with said one or more target devices via one or more wireless signal sets, each wireless signal set comprising at least a first-speed signal having a first transmission speed and a second-speed signal having a second transmission speed, and the first transmission speed being higher than the second transmission speed; and at least one processing unit performing actions for determining at least one distance between one target device and one reference device based on the time difference between the receiving time of the first-speed signal and the receiving time of the second-speed signal of the wireless signal set communicated between said reference and target devices.

17 Claims, 9 Drawing Sheets

(51) Int. Cl.
*G01S 5/30* (2006.01)
*G01S 1/80* (2006.01)

(56) References Cited

U.S. PATENT DOCUMENTS

2015/0247916 A1\* 9/2015 Bartov ................ H04W 56/001
                                                       455/456.6
2016/0202343 A1\* 7/2016 Okutsu ................ G01C 21/206
                                                       342/464

\* cited by examiner

RANGE-FINDING AND OBJECT-POSITIONING SYSTEMS AND METHODS USING SAME

CROSS-REFERENCE TO RELATED APPLICATIONS

This application is a continuation of U.S. patent application Ser. No. 16/031,553, filed on Jul. 10, 2018, which is a continuation of U.S. patent application Ser. No. 15/411,935, filed on Jan. 20, 2017, which claims the benefit of U.S. Provisional Patent Application Ser. No. 62/280,958, filed Jan. 20, 2016, the content of each of which is incorporated herein by reference in its entirety.

FIELD OF THE DISCLOSURE

The present invention relates generally to range-finding and object-positioning methods and systems, and in particular to mixed mode range-finding and object-positioning systems and methods of finding the distance between a reference object and a target object, and methods of determining the position of an object using same.

BACKGROUND

Many types of rangefinders are known, for example, one type of rangefinder generally comprises an infrared light emitting diode (LED) and a photodiode. The rangefinder emits an infrared pulse, which is reflected by a nearby object. The rangefinder receives the reflected infrared signal. Characteristics of the reflected infrared signal such as intensity, time of flight, frequency and/or phase are then analyzed to derive the object's range.

Another type of known rangefinder is the common radar system. An emitter, for example, a narrow beam width antenna such as a parabolic antenna, emits a radio frequency pulse (sometimes denoted as a signal beam). Radio reflective materials of objects within the signal beam reflect the signal back to the emitter. Measurements of the reflected signal's time of flight and Doppler shift are then used to compute the object's range, and in some systems, velocity.

Range-finding systems and methods, i.e., systems and methods for determining the distance between two objects, are often related to object positioning systems and methods. For example, object positioning systems usually use range-finding methods to first determine the distance between a target object and each of one or more reference objects, and then determining the position of the target object. Examples of known object positioning systems include the Global Positioning System (GPS) of the United States, the Global Navigation Satellite System (GLONASS) of Russia, the Galileo positioning system of the European Union, and the BeiDou Navigation Satellite System of China.

A difficulty with these systems is that the propagation speed of the emitted radio frequency (RF) signal, which is substantially the speed of light, is so high that even small errors in time of flight measurement amount to large errors in distance calculation, which results in more stringent and costly system requirements, e.g., precise time synchronization, wide signal bandwidth, and the like.

SUMMARY

According to one aspect of this disclosure, there is provided a ranging apparatus. The ranging apparatus comprises: at least one signal receiver for receiving at least one set of signals transmitted from at least one location, each of the at least one set of signals comprising at least a first-speed signal having a first transmission speed and a second-speed signal having a second transmission speed, and the first transmission speed being higher than the second transmission speed; and at least one processing unit for determining the distance between the apparatus and each of the at least one location based on the time difference between the time of receiving the first-speed signal transmitted from said location and the time of receiving the second-speed signal transmitted from said location.

In some embodiments, the distance between the apparatus and each of the at least one location is determined as:

$$d = \frac{c_1 c_2 \Delta t}{c_1 - c_2},$$

wherein d is the distance between the apparatus and said location, $\Delta t$ is the time difference between the time of receiving the first-speed signal transmitted from said location and the time of receiving the second-speed signal transmitted from said location, $c_1$ is the first speed, $c_2$ is the second speed, and $c_1 > c_2$.

In some embodiments, the first-speed signal is a Radio Frequency (RF) signal, and the second-speed signal is an acoustic signal. An acoustic signal is a mechanical wave that propagates in a medium, such as a gas (e.g., air), liquid or solid as vibration, audio signal, sound, ultrasound (i.e., ultrasonic signal) and/or infrasound, whether audible or inaudible. Hereinafter, the term "acoustic" and "audio" may be also used interchangeably for simplicity.

In some embodiments, the ranging apparatus further comprises a temperature sensor for determining the speed of sound for calibrating the speed of the transmitted acoustic signal.

In some embodiments, the ranging apparatus further comprises a temperature sensor and a humidity sensor for determining the speed of sound for calibrating the speed of the transmitted acoustic signal.

In some embodiments, the at least one signal receiver comprises at least a first signal receiver for receiving the first-speed signal, and a second signal receiver for receiving the second-speed signal.

In some embodiments, the first-speed signal and the second-speed signal of each signal set are substantially simultaneously transmitted from the first location.

According to one aspect of this disclosure, there is provided a positioning system. The positioning system comprises: one or more target devices; a plurality of reference devices communicating with said one or more target devices via one or more wireless signal sets, each wireless signal set comprising at least a first-speed signal having a first transmission speed and a second-speed signal having a second transmission speed, and the first transmission speed being higher than the second transmission speed; and at least one processing unit performing actions for determining at least one distance between one target device and one reference device based on the time difference between the receiving time of the first-speed signal and the receiving time of the second-speed signal of the wireless signal set communicated between said reference and target devices.

In some embodiments the at least one processing unit determines the location of one or more target devices using multilateration.

In some embodiments, the first-speed signal is a Radio Frequency (RF) signal, and the second-speed signal is an acoustic signal.

In some embodiments, the positioning apparatus further comprises a temperature sensor for determining the speed of sound for calibrating the speed of the transmitted acoustic signal.

According to one aspect of this disclosure, there is provided a ranging/positioning method. The method comprises: communicating, between one or more target devices and one or more reference devices, one or more wireless signal sets, each wireless signal set comprising at least a first-speed signal having a first transmission speed and a second-speed signal having a second transmission speed, and the first transmission speed being higher than the second transmission speed; and determining at least one distance between one target device and one reference device based on the time difference between the receiving time of the first-speed signal and the receiving time of the second-speed signal of the wireless signal set communicated between said reference and target devices.

According to one aspect of this disclosure, there is provided a virtual reality and/or augmented reality ranging/positioning system. The system comprises: communicating, between one or more target devices and one or more reference devices, one or more wireless signal sets, each wireless signal set comprising at least a first-speed signal having a first transmission speed and a second-speed signal having a second transmission speed, and the first transmission speed being higher than the second transmission speed; and determining at least one distance between one target device and one reference device based on the time difference between the receiving time of the first-speed signal and the receiving time of the second-speed signal of the wireless signal set communicated between said reference and target devices.

DETAILED DESCRIPTION

Figure 1:
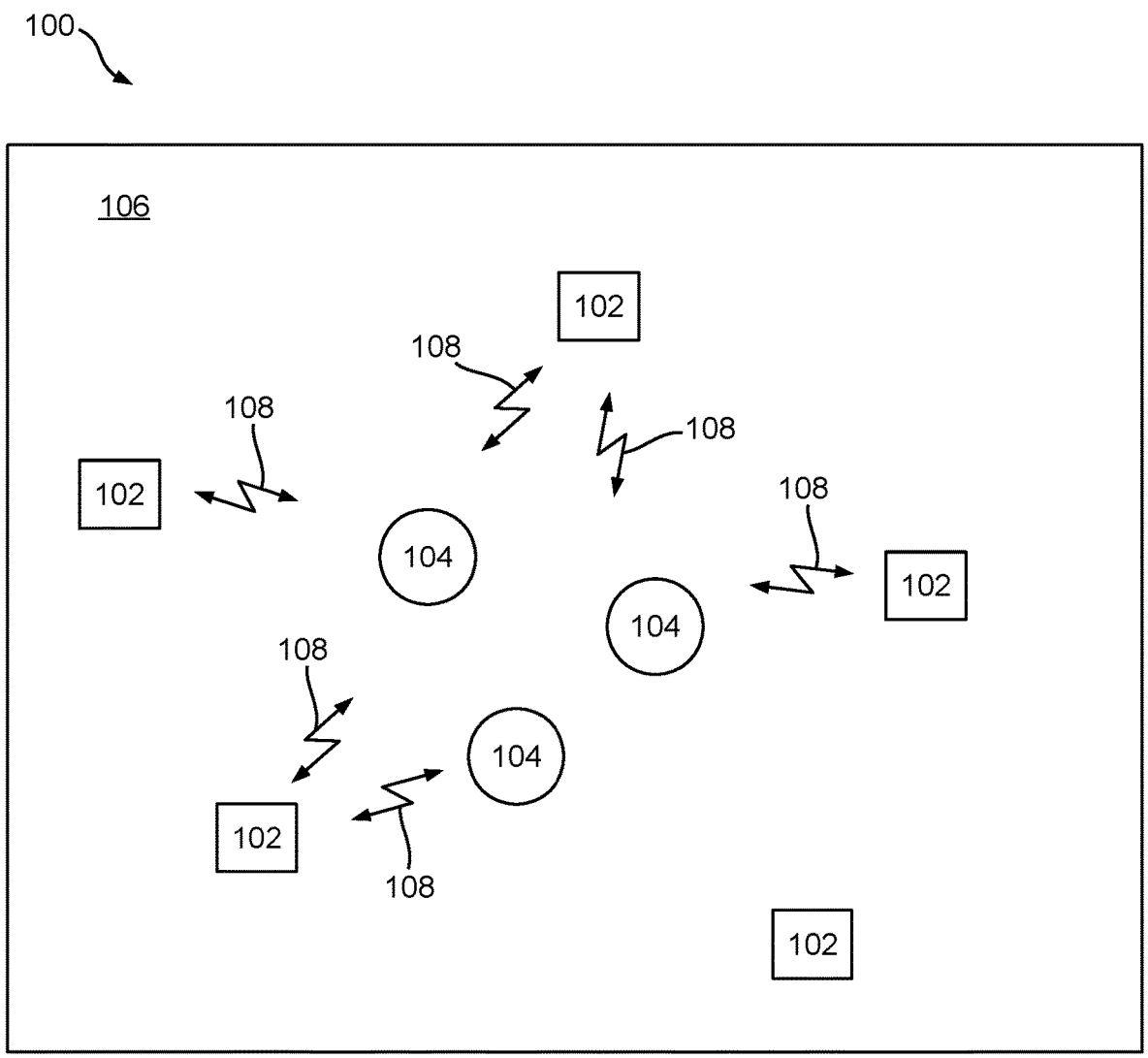
FIG. 1 is a schematic diagram illustrating a ranging system having one or more reference devices and one or more target devices in a site, according to one embodiment of the present disclosure.

With reference to FIG. 1, a ranging system is shown and is generally identified by the reference numeral 100. As shown, the system 100 comprises one or more reference devices 102 and one or more target devices 104 deployed in a site 106. The reference devices 102 in this embodiment transmit a wireless signal set 108, and the target devices 104 receive the wireless signal set 108. Thus, the reference devices 102 communicate with target devices 104 via the wireless signal set 108 for determining the ranges of the target devices 104. Herein, the range of an object refers to at least the distance between the object and a reference point, for example, a reference device.

In this embodiment, the one or more reference devices 102 are deployed at known locations of the site 106, for example, a device specifically designed for the purposes described herein, a WI-FI® access point (WI-FI is a registered trademark of Wi-Fi Alliance, Austin, Tex., USA), a BLUETOOTH® access point (BLUETOOTH is a registered trademark of Bluetooth Sig. Inc., Kirkland, Wash., USA), and/or the like. As will be described in more detail below, each reference device 102 also comprises a speaker.

The target devices 104 are associated with respective movable objects, such as humans, shopping carts, robots, a user's hands, and the like, moving within the site 106. The target devices 104 may be any device having the functionality as described below and suitable for associating with movable objects, for example, signal-receiving devices specifically designed for the purposes described herein, smartphones such as Apple® iPhone® (Apple and iPhone are registered trademarks of Apple Inc., Cupertino, Calif., U.S.A.), Android® phones (Android is a trademark of Google LLC, Mountain View, Calif., U.S.A.), Windows® phones (Windows is a registered trademark of Microsoft Corporation, Redmond, Wash., U.S.A.) and other smartphones, tablets such as Apple® iPad® (iPad is registered trademarks of Apple Inc., Cupertino, Calif., U.S.A.), Android® tablet, Microsoft® (Microsoft is a registered trademark of Microsoft Corporation, Redmond, Wash., U.S.A.) tablet and other tablets, laptops, Personal Digital Assistant (PDA), video game controllers, human-machine interface devices, three-dimensional (3D) interface devices for virtual reality applications, and the like.

The wireless signal set 108 transmitted between a reference device 102 and a target device 104 comprises at least a first-type, high-speed wireless signal such as an RF signal, for example, a WI-FI® signal, a BLUETOOTH® signal, an Enhanced ShockBurst® (ShockBurst is a registered trademark of Nordic Semiconductor ASA, Trondheim NORWAY) signal or the like, and a second-type, low-speed wireless signal such as an acoustic signal.

As those skilled in the art appreciate, in various embodiments, a reference device 102 may simultaneously communicate with one or more target devices 104, and a target device 104 may simultaneously communicate with one or more reference devices 102. Of course, there may exist, at least in some time periods, one or more reference devices 102 that do not communicate with any target device 104, and there may also exist, at least in some time periods, one or more target devices 104 that do not communicate with any reference device 102.

Suitable signal multiplexing technologies, such as frequency-division multiplexing, time-division multiplexing, code-division multiplexing and the like, may be used for communication between one or more reference devices 102 and one or more target devices 104. As many of these signal multiplexing technologies are known in the art, and as new signal multiplexing technologies are equally applicable to the ranging system disclosed herein, the description in the following only uses one reference device 102 communicating with one target device 104 as an example for illustrating the invention.

Figure 2:
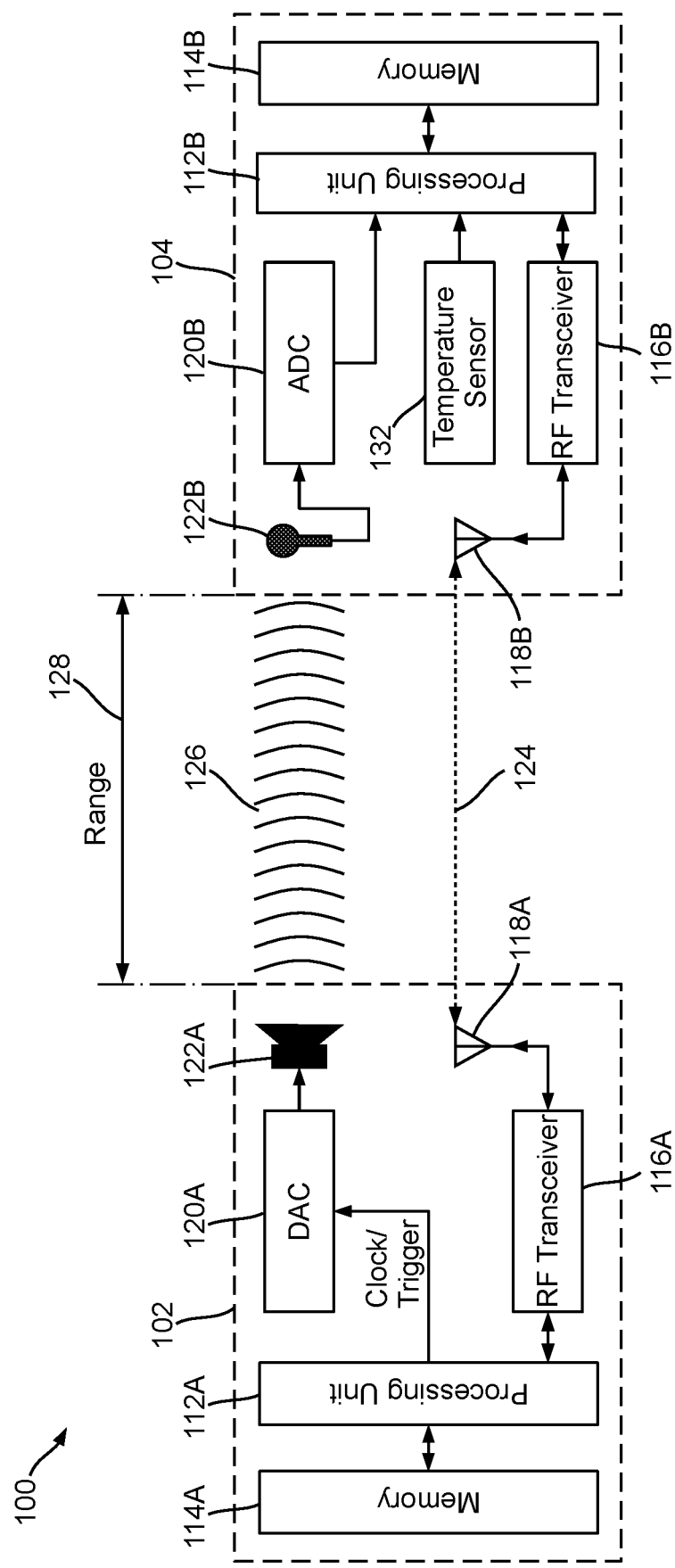
FIG. 2 is a schematic diagram showing the determination of range between a reference device and a target device of the system of FIG. 1.

As shown in FIG. 2, a reference device 102 comprises a processing unit 112A coupled to and controlling, via a bus or individual circuitries (not shown), a memory component 114A, and a set of signal transmitters including an RF transceiver 116A, and an acoustic transmitter 120A. The RF transceiver 116A is coupled to an antenna 118A for communicating with the target device 104 via a high-speed wireless signal such as an RF signal 124. As is known in the art, an RF transceiver is capable of transmitting and receiving an RF signal.

The acoustic transmitter 120A is coupled to a speaker 122A for transmitting a low-speed wireless signal such as an acoustic signal 126. In this embodiment, the acoustic transmitter 120A is a digital to analog converter (DAC), generating an analog signal to drive the speaker 122A and to produce the low-speed wireless signal 126.

In various embodiments, the reference device 102 may further comprise other suitable components and circuitry, depending on the implementation. For example, in some embodiments, the reference device 102 may comprise suitable signal-processing components and circuitry for processing the RF and/or acoustic signals for transmission. In another example, the reference device 102 may comprise suitable signal-processing components and circuitry for filtering the output of the DAC 120A.

From a functionality point of view, the processing unit 112A is also denoted as the transmitter logic layer. The RF transceiver 116A, antenna 118A, acoustic transmitter 120A and speaker 122A are collectively denoted as the transmitter physical layer.

Correspondingly, the target device 104 comprises a processing unit 112B coupled to and controlling, via a bus or individual circuitries (not shown), a memory component 114B, and a set of signal receivers including an RF transceiver 116B, and an acoustic receiver 120B. The RF transceiver 116B is also coupled to an antenna 118B for communicating with the reference device 102 via the RF (wireless) connection 124 (i.e., the RF signal 124; hereinafter the terms "RF signal" and "RF connection" may be also used interchangeably for simplicity). The acoustic receiver 120B is also coupled to a microphone 122B for receiving the acoustic signal transmitted from the reference device 102. In this embodiment, the acoustic receiver 120B is an analog to digital converter (ADC), converting the output of the microphone 122B to a digital signal for further processing. In some embodiments, the target device 104 further comprises a temperature sensor 132.

From a functionality point of view, the processing unit 112B is also denoted as the receiver logic layer. The RF transceiver 116B, antenna 118B, acoustic receiver 120B and microphone 122B are collectively denoted as the receiver physical layer.

Herein, each of the processing units 112A and 112B may be a specially designed controller chip using for example a programmed field-programmable gate array (FPGA), an application-specific integrated circuit (ASIC), and/or the like. Alternatively, each of the processing units 112A and 112B may be one or more single-core or multiple-core computing processors, such as Intel® microprocessors (Intel is a registered trademark of Intel Corporation, Santa Clara, Calif., U.S.A.), AMD microprocessors (AMD is a registered trademark of Advanced Micro Devices, Inc., Santa Clara, Calif., U.S.A.), ARM® microprocessors manufactured by a variety of manufactures under the ARM® architecture (ARM is a registered trademark of ARM Ltd., Cambridge, UK), AVR® microcontrollers (AVR and Atmel are registered trademarks of Atmel corporation, San Jose, Calif., USA), and/or the like. Each of the memory components 114A and 114B may be RAM, ROM, EEPROM, solid-state memory, hard disks, CD, DVD, flash memory, and/or the like.

The reference device 102 and the target device 104 use an RF signal 124 and an acoustic signal 126 for measurement of the range 128 therebetween. In this embodiment, the reference device 102 and the target device 104 also use the RF connection 124 for other communication purposes, such as sending and receiving commands and data to/from each other. However, those skilled in the art appreciate that, in some alternative embodiments, the RF connection 124 shown in FIG. 2 is used for range measuring only, and the reference device 102 and the target device 104 do not communicate with each other for other purposes. In some other embodiments, the RF connection 124 shown in FIG. 2 is used for range measuring only, and the reference device 102 and the target device 104 use a different wireless means, e.g., a different wireless channel, a different wireless communication technology, for communicating with each other for other purposes such as sending and receiving commands and data to/from each other. As an example, in one embodiment, the reference device 102 and the target device 104 use a an Enhanced ShockBurst™ signal as the RF signal 124 for range measuring, and use a BLUETOOTH® connection for sending and receiving commands and data to/from each other.

Figure 3A:
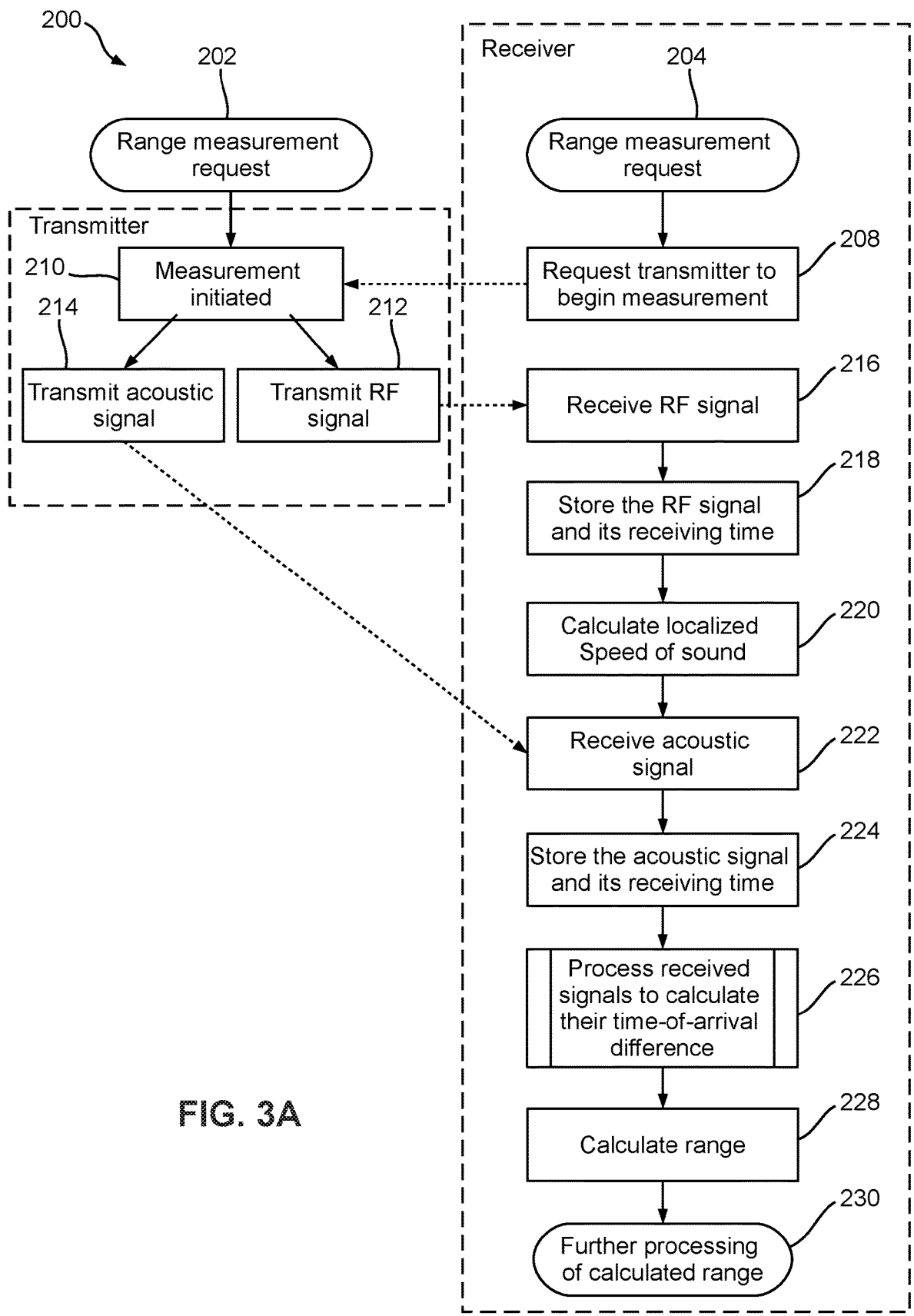
FIGS. 3A and 3B show a flowchart illustrating the steps of measuring range between the reference device and target device.

FIG. 3A is a flowchart showing the steps of measuring range between the reference device 102 and target device 104. As shown, a range measurement may be initiated by an initiator from the reference device side (step 202), or from the target device side (step 204). The initiator may be a user who manually initiates the range measurement by, for example, pressing a button on the reference device 102 or on the target device 104.

Alternatively, the initiator may be a computer program or service, which automatically initiates the range measurement as needed or periodically at predefined time intervals. The computer program or service may be a program or service running in the reference device 102 or the target device 104, or may be a program or service running in an external device in communication with the reference device 102 or the target device 104. For example, a user-launched map or navigation program running on the target device 104 may automatically and periodically request range measurement for updating the position of the target device 104. As another example, an external service such as a shopping cart tracking service running on an external server may communicate with one or more reference devices 102, requesting range measurement of the target devices 102 installed on shopping carts to continuously track the shopping carts in the site 106.

Further, the computer program or service may comprise software code stored in a content-erasable memory such as a hard drive, a solid-state memory, and/or the like. Alternatively, the computer program or service may comprise firmware code stored in a ROM, an EPROM (the content of which may be erasable using a special programming method), and/or the like.

If the range measurement request is initiated from the reference device side, the reference device 102 initiates the range measurement process at step 210.

On the other hand, if the range measurement request is initiated from the target device side, the target device 104 sends the request to the reference device 102, requesting the reference device 102 to begin the range measurement process (step 208). On the reference device side, in response to the range measurement request, the reference device 102 initiates the range measurement process (step 210).

After initiating range measurement, the reference device 102 transmits an RF signal 124 and an acoustic signal 126 to the target device 104, respectively, via the RF transceiver 116A through the antenna 118A, and via the acoustic transmitter 120A through the speaker 122A (steps 212 and 214, respectively).

In this embodiment, the low-speed acoustic signal 126 at the transmitter side is encoded with a binary codeword of length $L_P$, denoted by $P_{AC}[n]$, and then modulated to a ultrasonic frequency for transmission. As will be described in more detail later, at the receiver side, the received acoustic signal is demodulated and then decoded for further processing. Those skilled in the art appreciate that, in various embodiments, either, both, or neither of the RF and acoustic signals 124 and 126 may be encoded using a suitable coding scheme. Those skilled in the art appreciate that a variety of binary/M-ary coding schemes, for example, those using pseudorandom noise code, Gold code, Barker code, or the like, may be used for encoding the RF signal 124 and/or the acoustic signal 126. Coding is commonly used in positioning for improved time of arrival estimation, error detection, error correction, interference combatting and/or the like. Codeword modulation (inclusion) may be done using a variety of modulation methods e.g. on-off keying (OOK), audio frequency shift keying (AFSK), Binary Frequency Shift Keying (BFSK), Amplitude Shift Keying (ASK), Continuous Phase Frequency Shift Keying (CPFSK), or the like.

Preferably, the high-speed, RF signal 124 and the low-speed, acoustic signal 126 are transmitted substantially simultaneously. The RF and acoustic signals 124 and 126 propagate through their respective media. The speed of the RF signal 124 in air is approximately the speed of light, which is about $2.99 \times 10^8$ meters per second (m/s) in free space. On the other hand, the speed of the acoustic signal 126 is the speed of sound, which is approximately 343.4 m/s in air at 20° C.

At the target device, the target device 104 receives the RF signal 124 via the antenna 118B and the RF transceiver 116B, and stores the received RF signal and the time-of-arrival $t_{RF}$ of the received RF signal 124, in the memory component 114B (step 218).

As the speed of the acoustic signal 126 is influenced by environmental factors, primarily temperature, upon receipt of the RF signal 124, the target device 104 uses the temperature sensor 132 (see FIG. 2) to measure the ambient air temperature $T_S$ (step 220), and calculates a localized acoustic signal speed $v_{AC}$ as $$v_{AC} \approx 331.4 + 0.6 T_S, \qquad (1)$$

where $T_S$ is in degrees Celsius. Of course, in various embodiments, the localized acoustic signal speed $v_{AC}$ may be calculated with multiple measurements over time, filtered, and/or by using other known methods, such as Newton-Laplace equations, etc.

Then, the target device 104 starts to receive the acoustic signal 126 from the microphone 122B, storing the samples and the sampling starting time in memory 114B (step 224).

In this embodiment, receiving the acoustic signal 126 is conducted by sampling the output of the microphone 122B via the analog-to-digital converter 120B. After sampling, at step 222, the acoustic signal 126, represented in the discrete time domain and herein denoted as $S_A[n]$, and the time at which the sampling of the acoustic signal began, i.e., the starting time $t_{SA}$ of step 222, are stored in the memory component 114B (step 224).

After a period of time corresponding to a maximum time-of-flight $t_{max}$ expected for a predefined maximum observable range $d_{max}$, the acoustic signal sampling is stopped, and the process enters step 226. In this example, the acoustic signal 126, and therefore the discrete-time acoustic signal $S_A[n]$, comprises the codeword $P_{AC}[n]$.

A simplified approximation of the relationship between $t_{max}$ and $d_{max}$ is $t_{max} = (d_{max}/v_{AC}) + \delta$, although a more accurate equation that derives from (6) may also be used, The variable '$\delta$' is a predefined design parameter. For example, in some embodiments, where a binary codeword $P_{AC}[n]$ of length $L_P$ (bits) is used, any value $\delta < L_P T_b$, where $T_b$ is the length of one bit of the codeword $P_{AC}[n]$ in seconds, results in the truncation of the acoustic signal 126, affecting signal-to-noise ratio (SNR), hence, impacting the accuracy of range estimation. For simplicity of operation and without any loss of generality in the embodiments disclosed herein, it is predefined that $\delta = 0$.

In some embodiments, the time at which the sampling of the acoustic signal begins relative to the time-of-arrival of the high-speed signal $t_{RF}$ may be delayed by a fixed or determined value, $\tau_{SA} = t_{SA} - t_{RF}$, and the period of time the acoustic signal is sampled is a fixed or determined window period $t_{WIN}$, i.e., $$d_{max} = v_{AC}(\tau T_{SA} + t_{WIN}),$$

This implies a minimum observable distance $d_{min}$ given as $$d_{min} = \tau_{SA} v_{AC}$$

In some embodiments, $\tau_{SA}$ and $t_{WIN}$ may be determined from previous determined distances.

At step 226, the target device 104 then processes the received RF and acoustic signals 124 and 126 to calculate the time difference $\Delta t$ between the time-of-arrivals $t_{RF}$ and $t_{AC}$, i.e., $\Delta t = t_{AC} - t_{RF}$. Here, $t_{AC}$ is the time of arrival of the received acoustic signal 126. At this step, the time-of-arrival of each signal 124, 126 is determined using suitable signal processing methods depending on the implementation. For example, FIG. 3B illustrates an example of the detailed steps for calculating the time difference $\Delta t$ in discrete-time domain.

Figure 3B:
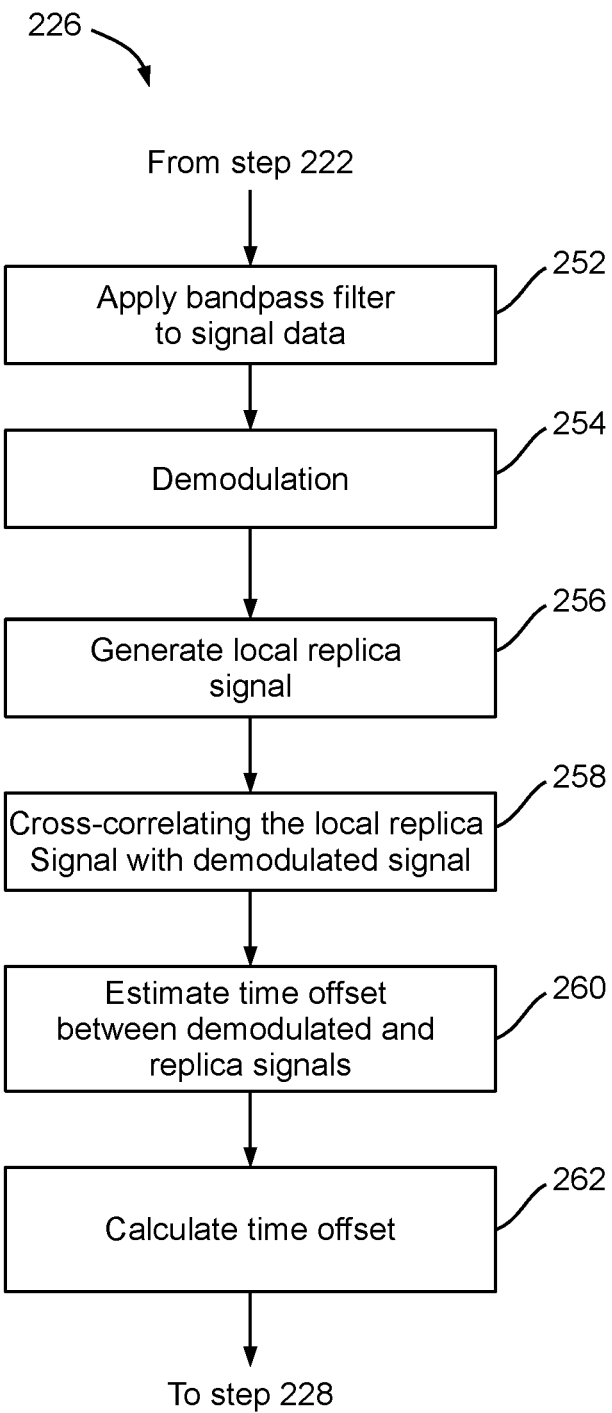

As shown in FIG. 3B, at step 252, a bandpass filter (BPF) is applied to the received acoustic signal $S_A[n]$ for noise reduction, generating a filtered acoustic signal $S_F[n]$. Note that the received acoustic signal $S_A[n]$ generally comprises noise, and may be distorted, for example, may exhibit a frequency shift from the transmitted acoustic signal. The BPF bandwidth is set to be wider than the acoustic signal bandwidth to account for sources of frequency shift, such as oscillator offset between the target device 104 and the reference device 102, Doppler shift due to relative motion, and the like.

While in this embodiment, the acoustic signal is first sampled, and then the sampled acoustic signal is bandpass filtered, in some alternative embodiments, the acoustic signal may first be bandpass filtered, and the filtered acoustic signal is sampled to obtain the filtered acoustic signal $S_F[n]$. In some other embodiments, bandpass filtering may be omitted.

Still referring to FIG. 3B, in this embodiment, the acoustic signal $S_F[n]$ is demodulated at step 254. Those skilled in the art appreciate that the demodulation process varies depending on the implementation and may include frequency estimation (e.g. using FFT or other frequency estimation methods), down conversion, filtering (e.g. low-pass filtering), and the like. The outcome of signal demodulation at step 253 is a demodulated signal $S_d[n]$, which in this embodiment contains the codeword $P_{AC}[n]$.

At step 256, a local replica signal $S_L[n]$ is generated at the target device 104, having the same codeword, $P_{AC}[n]$ as the acoustic signal 126 at the transmitter side before modulation.

In some embodiments, the local replica signal $S_L[n]$ is generated such that it also accounts for the estimated oscillator offset between the reference device 102 and the target device 104, and/or other sources of frequency shift, e.g. Doppler shift, and the like, by scaling the sample-rate at which the local signal is generated.

At step 258, the local replica signal $S_L[n]$ is cross-correlated with the demodulated signal $S_d[n]$ as follows:

$$R[n_d] = \sum_{n=1}^{N} S_L[n - n_d] S_d[n], \quad (2)$$

where N is the total number of samples in the signal $S_d[n]$. Then, at step 260, the offset $n_0$ between the local replica signal $S_L[n]$ and the demodulated acoustic signal $S_d[n]$ is estimated using suitable time of arrival estimation methods. For example, in this embodiment, a Maximum Likelihood estimator is used to estimate the offset $n_0$ as:

$$\sum_{n=1}^{N} S_L[n - n_0] S_d[n] = \max_{n_d}(R[n_d]), \quad (3)$$

$$n_0 = \underset{n_d}{\operatorname{argmax}}(R[n_d]). \quad (4)$$

As in this embodiment a correlator is used, $n_0$ thus represents the offset in samples between $S_L[n]$ and $S_d[n]$. Thus, at step 262, the time difference $\Delta t$ between the time-of-arrivals $t_{RF}$ and $t_{AC}$ in the continuous-time domain is:

$$\Delta t = t_{AC} - t_{RF} = t_{SA} + \frac{n_0}{F_s} - t_{RF} \quad (5)$$

where $F_S$ is the sampling rate (in samples per second) of the analog-to-digital converter 120B, and thus is the sampling rate of the received acoustic signal 126. The process then goes to step 228 of FIG. 3A.

In some alternate embodiments, interpolation methods may be used to improve the estimation accuracy of $t_{AC}$. The standard parabolic interpolation method is given below, however other methods are known and may be used, such as the early-late method.

$$t_{AC} = t_{SA} + \frac{1}{F_s}\left[n_0 + \frac{(R[n_0+1] - R[n_0-1])}{2(2R[n_0] - R[n_0-1] - R[n_0+1])}\right]$$

Referring again to FIG. 3A, at step 228, the target device 104 calculates the range or distance d between the reference device 102 and the target device 104 as:

$$d = \frac{v_{RF} v_{AC} \Delta t}{v_{RF} - v_{AC}}, \quad (6)$$

where $v_{RF}=2.99\times10^8$ m/s is the RF signal speed, $v_{AC}$ is the localized acoustic signal speed calculated using Equation (1), and $\Delta t$ is calculated using Equation (5).

The calculated range d is further processed (step 230). For example, if the target device 104 is not the initiator of the measurement, then the calculated range d may be reported to the initiator. As another example, in alternative embodiments where the target device 104 is not the initiator of the measurement, then it may report one or more of the measured/calculated/estimated parameters e.g., $\Delta t$, $t_{AC}$, the calculated range d, and/or other relevant parameters, to the initiator.

In some embodiments, some of the target devices 104 are equipped with other ancillary sensors e.g. accelerometer, gyroscope, infrared sensor, and/or the like. The inclusion of such ancillary sensor(s) provide(s) additional information about other environmental parameters and/or about the state of the device, e.g., its orientation, which may be deemed useful for some applications such as virtual reality for example.

Figure 4:
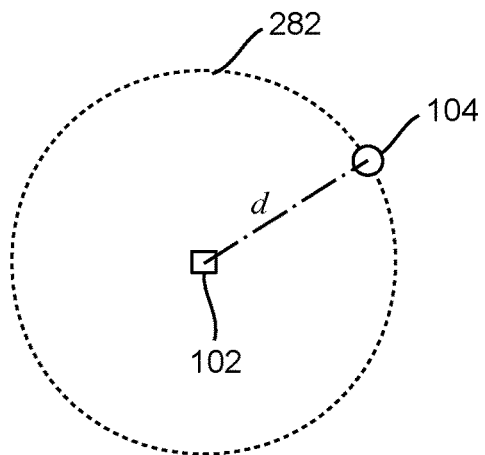
FIG. 4 shows an example of determining the distance between the reference device and target device, and the possible locations of the target device.

In some embodiments, the reference device 102 and the target device 104 are substantially at the same elevation. Then, as shown in FIG. 4, after calculation of d, it is determined that the target device 104 is located at a point on the circle 282 centered at the reference device 102 and having a radius of about d. As the reference device 102 is at a known location in the site 106, the location of the target device 104 is then somewhere along the circle perimeter 282. In some embodiments that the accurate location of the target device 104 is not required, determining the location of the target device 104 to be somewhere along the perimeter of a calculated circle may be sufficient.

Figure 5A:
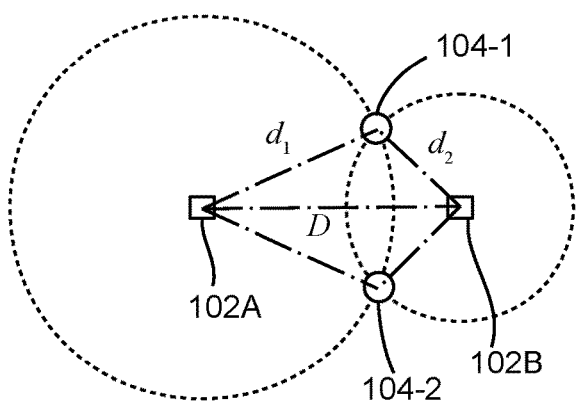
FIG. 5A shows an example of determining the location of the target device from two reference devices and by using triangulation.

As shown in FIG. 5A, in some embodiments, the range measurement shown in FIGS. 3A and 3B is conducted for determining the distance between the target device 104 and each of two reference devices 102A and 102B, wherein the distance D between reference devices 102A and 102B is known. Following the process 200 of FIGS. 3A and 3B target device, it is estimated that the distance between the reference device 102A and the target device 104 is $d_1$, and the distance between the reference device 102B and the target device 104 is $d_2$. In this example, it is further assumed that the reference devices 102A and 102B and the target device 104 are substantially at the same elevation. Then, the location of the target device 104 may be determined using well-known triangulation at any one of the two locations 104-1 and 104-2. In some embodiments that the accurate location of the target device 104 is not required, determining the location of the target device 104 to be at one of two possible locations may be sufficient.

Figure 5B:
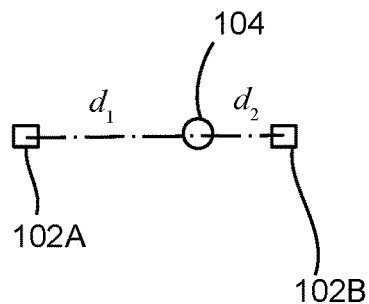
FIG. 5B shows an example of determining the location of the target device from two reference devices and by using triangulation, wherein the target device is collinear with the two reference devices.

As shown in FIG. 5B, in some embodiments where a target device 104 is collinear with two reference devices 102, after determining the distance between the target device 104 and each of the two reference devices 102, the position of the target device 104 may be determined as a one-dimensional (1D) position along the line of the two reference devices 102 based on the determined distances between the target device 104 and the two reference devices 102.

In some other embodiments, the system may use other suitable information to refine the location of the target device. For example, if the system knows that the target device 104 can only be located on one side of the line connecting the reference devices 102A and 102B, for example, the other side is an area or room inaccessible to the target device 104, then, the system can further refine the location of the target device 104 to be one of the locations 104-1 and 104-2 that is accessible thereto.

Figure 6:
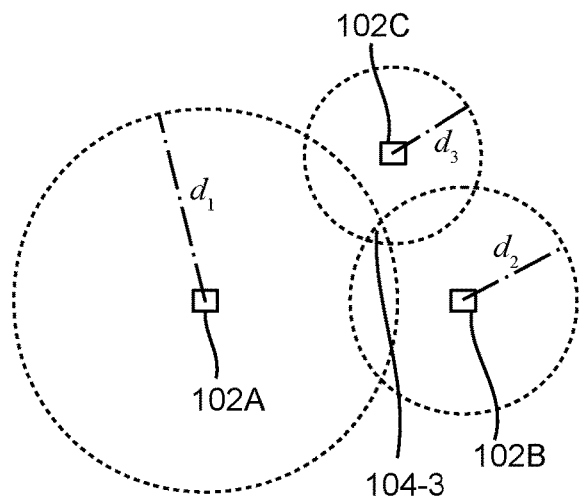
FIG. 6 shows an example of determining the location of the target device from three reference devices and by using triangulation.

In another embodiment as shown in FIG. 6, three reference devices 102A, 102B and 102C may be used for determining the location of a target device 104 to be within the area 104-3, after calculating the distances $d_1$, $d_2$, and $d_3$ between the target device 104 and the reference devices 102A, 102B and 102C, respectively. In this embodiment, the system assumes that the target device 104 and the three reference devices 102A, 102B and 102C are at the same elevation.

Figure 7A:
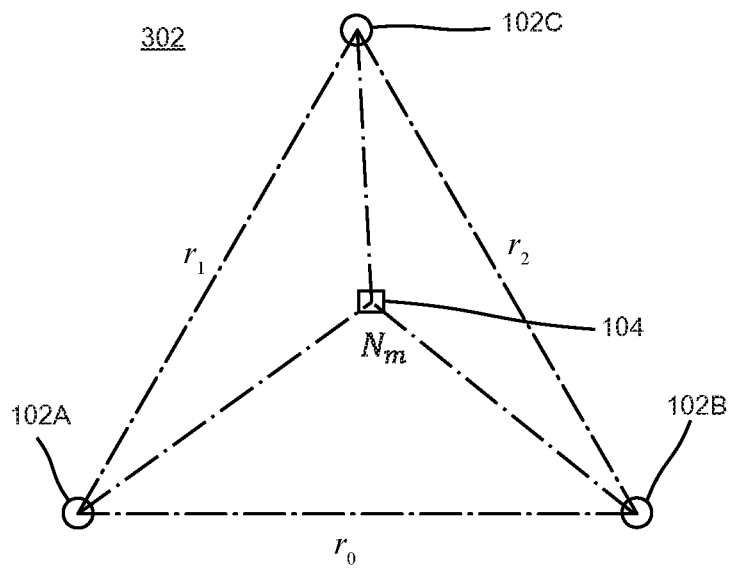
FIG. 7A is a top view of a portion of the site of FIG. 1, showing three reference devices at known three-dimensional (3D) locations and a target device.
Figure 7B:
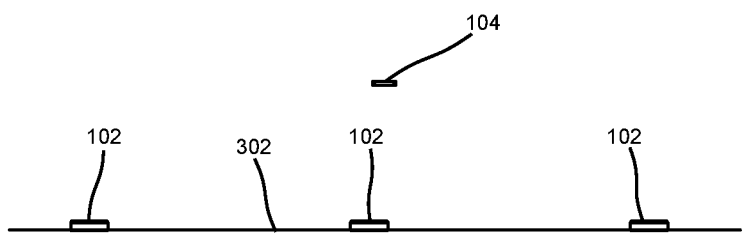
FIG. 7B is a side view of the site portion of FIG. 7A.
Figure 7C:
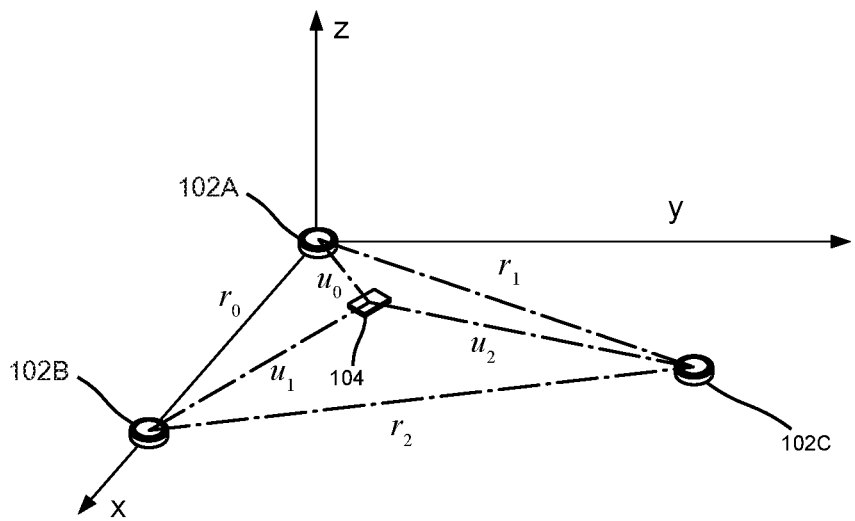
FIG. 7C is a perspective view of the site portion of FIG. 7A.

In an alternative embodiment, the system does not consider that the target device 104 and reference devices 102 are at the same elevation. For example, FIGS. 7A to 7C show three reference devices 102A, 102B and 102C at the same elevation 302, and a target device 104 not necessarily at the same elevation as the reference device 102A to 102C. The distances $r_0$ between reference devices 102A and 102B, $r_1$ between reference devices 102A and 102C and $r_2$ between reference devices 102B and 102C, are known.

In this example, a local right-handed coordinate system is defined (as shown in FIG. 7C) with the reference device 102A at the center (i.e. $x_a=0$, $y_a=0$, $z_a=0$). It is further assumed that the reference device 102B is located on the positive x-axis (i.e., $x_b=r_0>0$, $y_b=0$) and the reference device 102C is located on the first or the second quadrant on the x-y plane of the coordinate system excluding on the x-axis (i.e. $y_c>0$). With these assumptions, the location of the reference device 102C, ($x_c$, $y_c$, $z_c$), relative to this coordinate system may be calculated from the well-known trilateration equations as:

$$x_c = \frac{r_0^2 + r_1^2 - r_2^2}{2r_0}, \tag{7}$$

$$y_c = \sqrt{r_1^2 - \left(\frac{r_0^2 + r_1^2 - r_2^2}{2r_0}\right)^2}, \tag{8}$$

$$z_c = 0. \tag{9}$$

Following the process 200 of FIGS. 3A and 3B, the distances $u_0$, $u_1$ and $u_2$ between the target device 104 and, respectively, the reference devices 102A, 102B and 102C are determined. Then, using the well-known trilateration equations, the location of the target device 104 relative to the coordinate system defined earlier target device may be calculated as:

$$x_m = \frac{u_0^2 - u_1^2 + r_0^2}{2r_0}, \tag{10}$$

$$y_m = \frac{u_0^2 - u_2^2 + x_c^2 + y_c^2}{2y_c} - \frac{x_c}{y_c}x_m, \tag{11}$$

$$z_m = z_m^+ = \sqrt{u_0^2 - x_m^2 - y_m^2}, \text{ or} \tag{12}$$
$$z_m = z_m^- = -\sqrt{u_0^2 - x_m^2 - y_m^2}$$

Therefore, the location of the target device 104 may be at ($x_m$, $y_m$, $z_m^+$), or at ($x_m$, $y_m$, $z_m^-$). In some embodiments that the accurate location of the target device 104 is not required, determining the location of the target device 104 to be at any one of two possible locations may be sufficient. In some embodiments, determining the target device 104 is at any one of two possible locations may be sufficient for relative positioning thereafter.

In some embodiments, the system may further use other suitable information to refine the location of the target device 104. For example, if the location ($x_m$, $y_m$, $z_m^-$) is inaccessible to the target device, or if the system knows that the references devices are on a floor of a room, and the target device 104 is on or above the floor 302, the system then determines that the location of the target device is at ($x_m$, $y_m$, $z_m^+$). Alternatively, the system may use more than three non-coplanar reference devices 102 to more accurately determine the location of the target device 104.

For the marginal case in which the reference devices 102 are coplanar, the location of the target device calculated using trilateration, or more generally, multilateration, may be ambiguous, and the system may further use other suitable information, e.g., the area accessibility or inaccessibility of the target device 104 to eliminate unlikely locations and solve the ambiguity.

Other suitable position estimate methods can alternatively be used. For example, in one embodiment, a Least Squares method may be used to calculate the 3D coordinates ($x_m$, $y_m$, $z_m$) of the target device 104 in the 3D space using the known positions ($x_1$, $y_1$, $z_1$), ($x_2$, $y_2$, $z_2$), . . . , ($x_N$, $y_N$, $z_N$) of four or more reference devices 102, relative to an arbitrary but otherwise known coordinate system. In this example, it is further assumed that at least one of the reference devices 102 is non-coplanar relative to other reference devices 102. Following the process 200 of FIGS. 3A and 3B the distances $R_1$, $R_2$, . . . , and $R_N$ between the target device 104 and the N reference devices 102 are determined as:

$$R_n = (x_m - x_n)^2 + (y_m - y_n)^2 + (z_m - z_n)^2, \tag{13}$$

for n=1, 2, . . . , N.
Define $$P = \begin{bmatrix} x_1 \\ y_1 \\ z_1 \\ \vdots \\ x_N \\ y_N \\ z_N \end{bmatrix}, \tag{14}$$

-continued $$P_m = \begin{bmatrix} x_m \\ y_m \\ z_m \end{bmatrix}, \text{ and} \quad (15)$$

$$R = \begin{bmatrix} R_1 \\ \vdots \\ R_N \end{bmatrix}. \quad (16)$$

Then, the location of the target device 104 relative to the reference devices with respect to the defined coordinate system can be expressed as:

$$\begin{bmatrix} x_m \\ y_m \\ z_m \\ \sqrt{x_m^2 + y_m^2 + z_m^2} \end{bmatrix} = (A^T A)^{-1} A^T b, \quad (17)$$

where $(\bullet)^T$ represents matrix transpose, $(\bullet)^{-1}$ represents matrix inverse, $$A = \begin{bmatrix} -2x_1 & -2y_1 & -2z_1 & 1 \\ -2x_2 & -2y_2 & -2z_2 & 1 \\ \vdots & \vdots & \vdots & \vdots \\ -2x_N & -2y_N & -2z_N & 1 \end{bmatrix}, \text{ and} \quad (18)$$

$$b = \begin{bmatrix} R_1 - x_1^2 - y_1^2 - z_1^2 \\ \vdots \\ R_N - x_N^2 - y_N^2 - z_N^2 \end{bmatrix}. \quad (19)$$

In some embodiments, the positions of all or a subset of the reference devices 102 may be surveyed during calibration.

Those skilled in the art appreciate that latency in the reference and target devices 102 and 104 may cause error in range determination. Herein, the latency comprises audio latency, i.e., the latency of the audio signal 126, and RF signal latency, i.e., the latency of the RF signal 124.

The audio latency in the reference device 102 refers to the delay or time difference from the time that the processing unit 112A signals the digital to analog converter 120A to transmit the audio signal 126, to the time that the audio signal 126 has actually been transmitted from the speaker 122A. The RF signal latency in the reference device 102 refers to the delay from the time that the processing unit 112A signals the RF transceiver 116A to transmit the RF signal 124, to the start of transmission of the RF signal 124 from the antenna 118A.

Similarly, the audio latency in the target device 104 refers to the delay from the time that the audio signal 126 is received by the microphone 122B, and the time that the received audio signal 126 has been received by the processing unit 112B for processing. The RF signal latency in the target device 104 refers to the delay from the time that the RF signal 124 is received at the antenna 118B, and the time that the received RF signal 124 has been time-tagged by the transceiver.

In some embodiments, the overall latency is considered small and hence ignored. However, in these embodiments, the accuracy of the calculated distance, and consequently the accuracy of the calculated target device location may be reduced.

In some embodiments, the system estimates the overall latency using a calibration process to improve the rangefinding and/or object positioning accuracy.

In an alternate embodiment, an arbitrary but known delay $\tau^{ENC}$ is introduced in the transmission of the acoustic signal 124, for example, for privacy/security purposes. Therefore, calculation of the correct range requires specific knowledge of the additional term $\tau^{ENC}$. Depending on the implementation, $\tau^{ENC}$ may be generated from a pre-shared key such as with a hash-based message authentication codes (HMAC) based one-time password (HOTP) algorithm, time-based one-time password (TOTP) algorithm or the like, or pre-generated by a central server, or generated randomly and communicated to the receiver using public key cryptographic methods, such as the Rivest-Shamir-Adleman (RSA) method or the like.

In an alternative embodiment, some reference devices 102 may each comprise an RF signal transmitter rather than an RF transceiver. These reference devices 102 therefore can only act as signal transmitters.

In an alternative embodiment, some target devices 104 may each comprise an RF signal receiver rather than an RF transceiver. These target devices 104 therefore can only receive RF signals.

Figure 8:
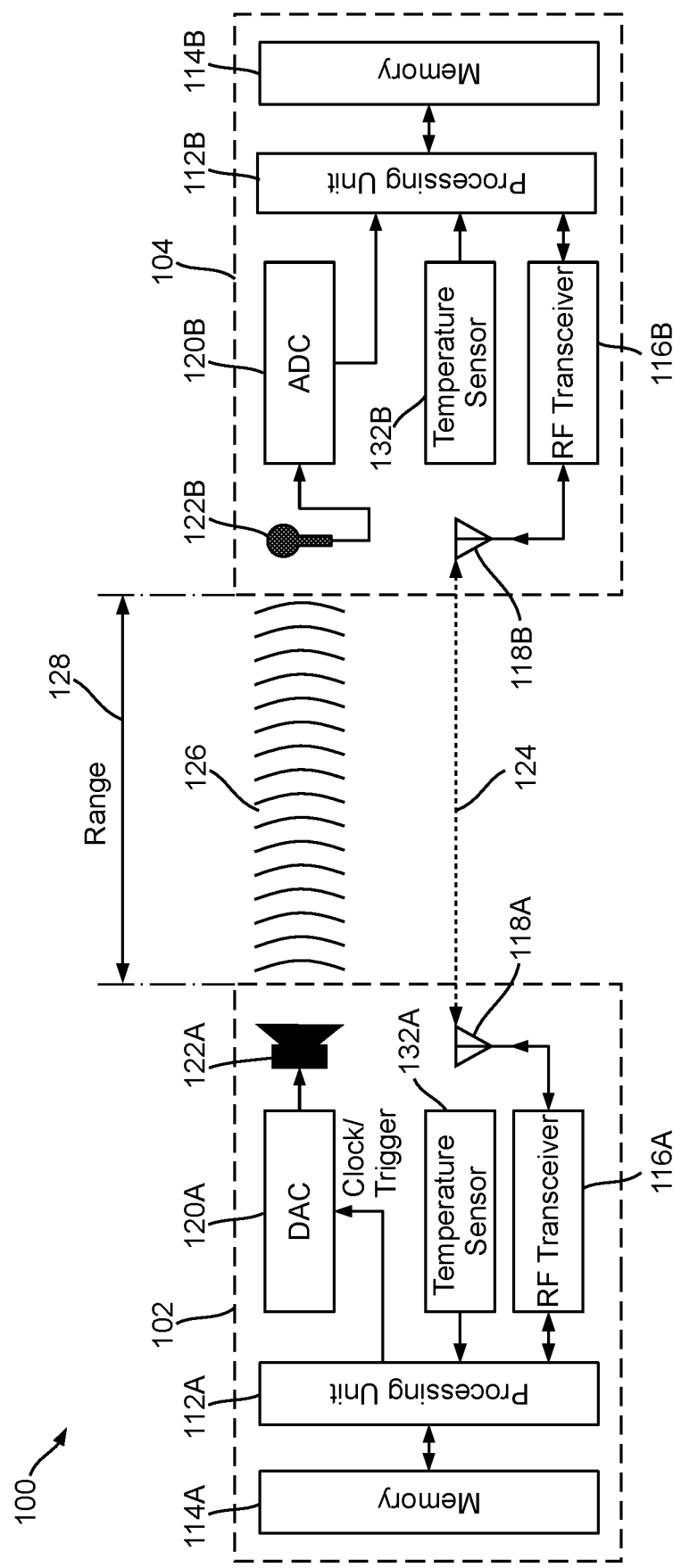
FIG. 8 is a schematic diagram showing the determination of range between a reference device and a target device of the system of FIG. 1, according to an alternative embodiment.

In an alternative embodiment as shown in FIG. 8, some reference devices 102 may each comprise a temperature sensor 132A. In this embodiment, the speed of sound is also calculated at the reference devices 102, and an averaged speed of sound is calculated by averaging the calculated speeds of sound at both the reference devices 102 and the target device 104 for improved accuracy.

In an alternative embodiment, the high-speed wireless signal 124 is an optical signal. A disadvantage of the system in this embodiment is that obstacles may block the optical signal path, therefore hindering the range estimation.

In above embodiments, temperature sensor is used for calibrating the speed of sound. In some alternative embodiments, other known methods may be used to measure the local speed of sound or the ambient temperature.

In some alternative embodiments, neither the target device 104 nor the reference device 102 contains a temperature sensor. In this embodiment, an approximate predefined value may be used. Those skilled in the art appreciate that ranging errors may result from such approximation.

In some embodiments, the high-speed, RF signal 124 and the low-speed, acoustic signal 126 are transmitted substantially simultaneously or within a time interval as small as possible. In an alternative embodiment, one of the RF signal 124 and the acoustic signal 126 is transmitted at a different time instant after the transmission of the other thereof, with a predefined time delay that is known to the initiating device.

In some embodiments, the reference devices 102 transmit the wireless signal set 108, and the target devices receive the wireless signal set 108. In some alternative embodiments, the target devices 104 may transmit the wireless signal set 108, and the reference devices 102 may receive the wireless signal set 108.

Figure 9:
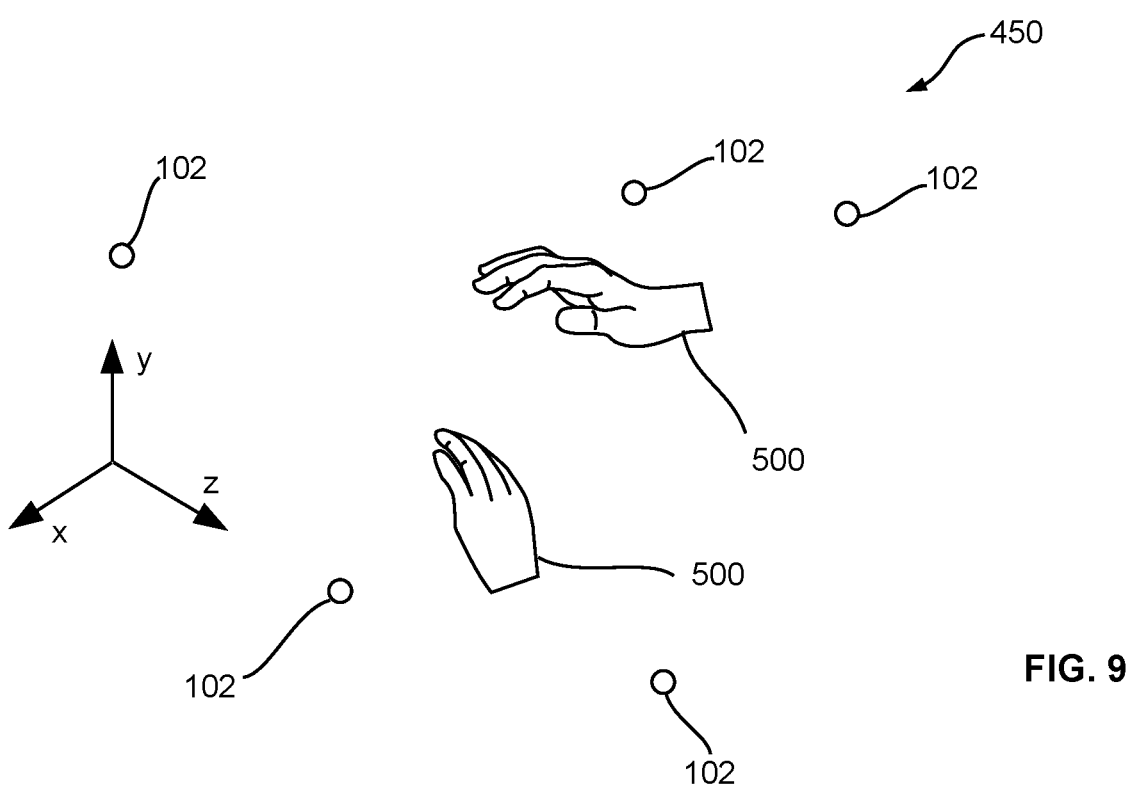
FIG. 9 illustrates a ranging system of FIG. 1 in the form of a 3D input system, according to an alternative embodiment.

For example, as shown in FIG. 9, in some alternative embodiments, the positioning system 100 may be part of a virtual reality (VR) system and/or augmented reality (AR) system.

In the example of FIG. 9, the virtual reality (VR) system is a three-dimensional (3D) input system. The 3D input system 100 comprises a computing device (not shown) such as a tablet, smartphone, laptop computer, desktop computer, or the like, one or more wearable devices such as gloves 500 each coupled with a target device 104 (see FIGS. 10A and 10B), and a plurality of reference devices 102 at known locations. The computing device is in communication with the gloves 500 and the reference devices 102 using a suitable wireless connection, e.g. ANT™ (ANT is a trademark of ANT Wireless, Cochrane, Alberta, Canada), BLUETOOTH®, or the like, enabling a variety of user inputs, e.g. various gestures or commands. Other wireless or wired communication methods, e.g., WIFI®, ZIGBEE® (ZIGBEE is a registered trademark of ZigBee Alliance Corp., San Ramon, Calif., USA), Ethernet, USB, Optical connection, serial cable, parallel cable, or the like, may alternatively be used for functionally connecting the computing device, the gloves 500 and the reference devices 102.

Figure 10A:
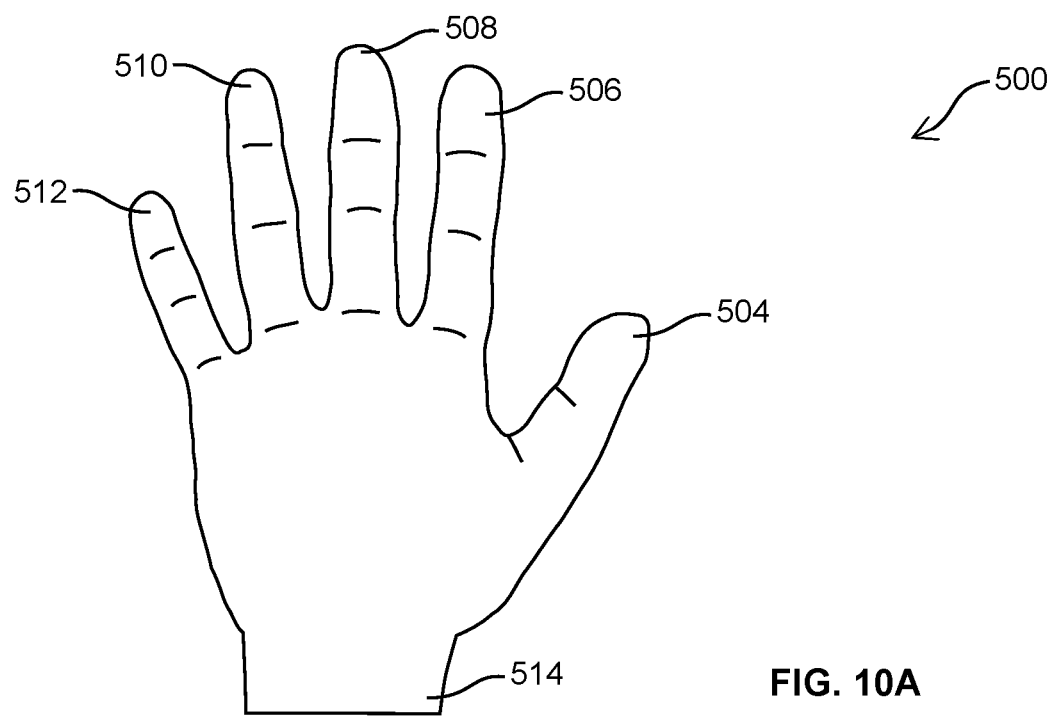
FIG. 10A is a bottom view of a position-sensing glove of the 3D input system of FIG. 9.
Figure 10B:
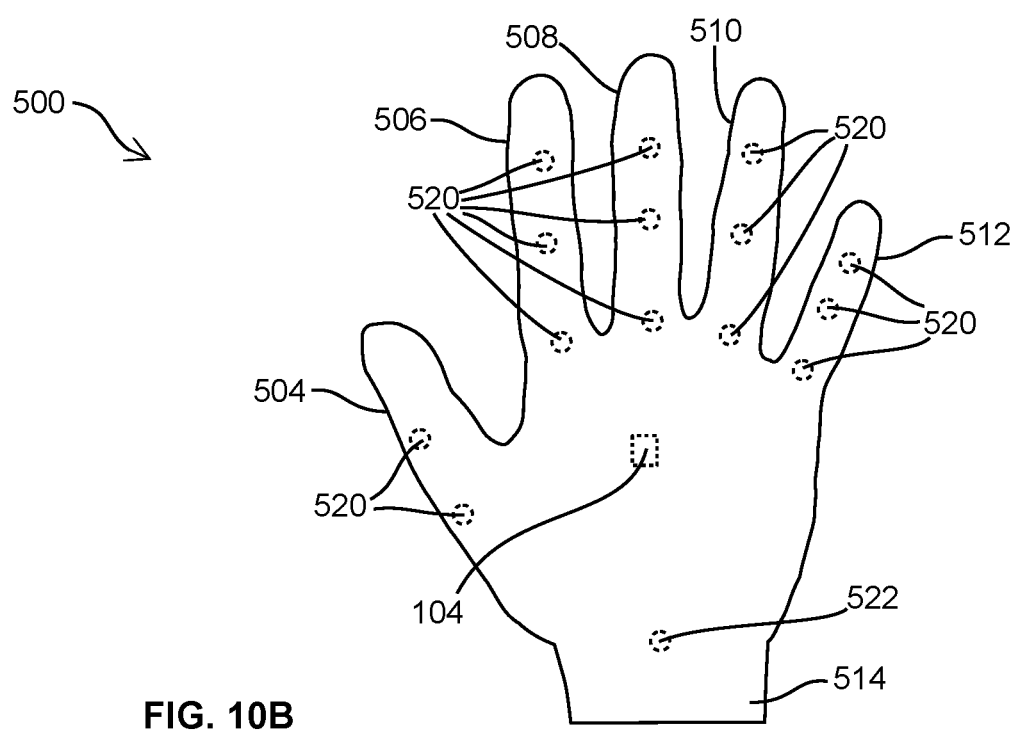
FIG. 10B is a top view of the position-sensing glove of FIG. 10A.

FIGS. 10A and 10B show the bottom (palm) and top (back) views of a right-hand position-sensing glove 500, respectively. A left-hand position-sensing glove is similar to that of FIGS. 15A and 15B but with a generally mirrored configuration. The glove 500 is made of lightweight fabrics and mesh so as to minimize hindering the user's dexterity. As shown, the glove 500 comprises five finger portions 504 to 512 and a wrist portion 514, corresponding to the five fingers and the wrist of the user's hand. A plurality of angle encoders 520 are installed on the top side of the glove 500 at the positions corresponding to the joints of human fingers (i.e., on the joints of the entire finger from the fingertip to the knuckle of the finger joining the hand) for detecting the angle of the respective joint. An angle encoders 522 is also installed on the glove 500 at the wrist position 514 for detecting the angle of the wrist. A target device 104 is affixed to the glove 500 to provide ranging information of the glove 500 relative to one or more reference devices 102. The ranging information may then be fused with the measured angles detected by the angle encoders on the glove 500 to interpret a variety of user inputs such as hand gesture or commands in a 3D space. The 3D input system 100 and the position-sensing glove 500 are similar to those described in US Patent Publication No. US 2016/0132111 A1, published on May 12, 2016 and assigned to the Applicant of the subject application, the content of which is incorporated herein by reference in its entirety.

After determining the 3D position of the glove 500, the position of each fingertip in the 3D space may be determined. Gestures and/or commands can then be determined based on the obtained positions.

Other VR equipment may also comprise one or more target devices 104 for determining the range/position thereof in a 3D space. For example, in some embodiments, a head-mounted display may comprise a target device 104 affixed thereto for range estimation or relative position estimation within the virtual environment.

Those skilled it the art appreciate that it is not necessary that all reference devices have to be transmitter devices for transmitting wireless signal sets and all target devices have to be receiver devices for receiving wireless signal sets, nor that all target devices have to be transmitter devices and all references devices have to be receiver devices. In fact, in some embodiments, some references devices may be transmitter devices and other references devices may be receiver devices. Correspondingly, some target devices may be receiver devices and other target devices may be transmitter devices.

Although embodiments have been described above with reference to the accompanying drawings, those of skill in the art will appreciate that variations and modifications may be made without departing from the scope thereof as defined by the appended claims.

What is claimed is:

1. A three-dimensional (3D) interface apparatus for virtual reality and/or augmented reality, the apparatus comprising:
a communication component for transmitting or receiving a plurality of signal sets to or from a plurality of locations, each signal set of the plurality of signal sets comprising at least a first-speed signal having a first transmission speed and a second-speed signal having a second transmission speed, and the first transmission speed being higher than the second transmission speed; and
one or more non-transitory computer-readable storage devices comprising computer-executable instructions which, when executed, cause one or more processing structures to perform actions comprising:
determining at least one of a first latency in the transmission and receiving of the first-speed signal and a second latency in the transmission and receiving of the second-speed signal;
determining at least one distance between the communication component and one of the plurality of locations based on at least the determined at least one of the first and the second latencies and a time difference between a receiving time of the first-speed signal and a receiving time of the second-speed signal of the signal set communicated between the communication component and the location.

2. The apparatus of claim 1 further comprising:
one or more angle encoders for coupling to one or more joints for detecting angles thereof, said one or more joints rotatably coupling an end point to the apparatus; and
wherein said computer-executable instructions, when executed, cause the one or more processing structures to further perform actions comprising:
determining the location of the end point based on said at least one distance and said angles.

3. The apparatus of claim 1, wherein said computer-executable instructions, when executed, cause the one or more processing structures to further perform actions comprising:
executing a calibration process for determining the at least one of the first and the second latencies.

4. The apparatus of claim 1, wherein the second-speed signal is transmitted after a delay from the transmission of the first-speed signal; and
wherein said determining the at least one distance between the communication component and the location comprises:
determining the at least one distance between the communication component and the location based on the delay and the time difference between the receiving time of the first-speed signal and the receiving time of the second-speed signal of the wireless signal set communicated between the communication component and the location.

5. The apparatus of claim 4, wherein said delay is a pre-shared key.

6. The apparatus of claim 4, wherein said delay is generated from a pre-shared key using a hash-based message authentication codes (HMAC) based one-time password (HOTP) algorithm, or a time-based one-time password (TOTP) algorithm.

7. The apparatus of claim 4, wherein said delay is obtained from a server.

8. The apparatus of claim 4, wherein said delay is randomly generated.

9. The apparatus of claim 8, wherein said computer-executable instructions, when executed, cause the one or more processing structures to further perform actions comprising:
receiving said delay using a public key cryptographic method.

10. The apparatus of claim 8, wherein said computer-executable instructions, when executed, cause the one or more processing structures to further perform actions comprising:
receiving said delay using a Rivest-Shamir-Adleman (RSA) method.

11. The apparatus of claim 1, wherein said computer-executable instructions, when executed, cause the one or more processing structures to further perform actions comprising:
determining a discrete-time version of the received first-speed signal,
determining a discrete-time version of the received second-speed signal, and
determining the distance between the communication component and the location based on a Maximum Likelihood estimation of a time difference between a receiving time of the discrete-time first-speed signal and a receiving time of an interpolation of the second-speed signal.

12. The apparatus of claim 11, wherein said determining the distance between the apparatus and the location comprises:
determining the distance between the communication component and the location based on the Maximum Likelihood estimation of the time difference between the receiving time of the discrete-time first-speed signal and a receiving time of a parabolic interpolation of the second-speed signal.

13. The apparatus of claim 1, wherein said computer-executable instructions, when executed, cause the one or more processing structures to further perform actions comprising:
determining the distance between the communication component and each of the plurality of locations based on a time difference between a time of receiving the first-speed signal transmitted to or from said location and a time of receiving the second-speed signal transmitted to or from said location, and
determining the position of the apparatus using a Least Squares method and based on the distances.

14. A three-dimensional (3D) interface system for virtual reality and/or augmented reality, the system comprising:
a plurality of reference devices;
one or more wearable devices each comprising a communication component for transmitting or receiving a plurality of signal sets to or from the plurality of reference devices, each signal set of the plurality of signal sets comprising at least a first-speed signal having a first transmission speed and a second-speed signal having a second transmission speed, and the first transmission speed being higher than the second transmission speed; and
a computing device in communication with the plurality of reference devices and the one or more wearable devices for determining at least one distance between one wearable device and one reference device based on at least one of a first latency in the transmission and receiving of the first-speed signal and a second latency in the transmission and receiving of the second-speed signal, and a time difference between a receiving time of the first-speed signal and a receiving time of the second-speed signal of the wireless signal set communicated between said wearable and reference devices.

15. An apparatus comprising:
a communication component for transmitting or receiving a set of signals to or from a location using at least one of frequency-division multiplexing, time-division multiplexing, and code-division multiplexing, the set of signal comprising at least a first-speed signal having a first transmission speed and a second-speed signal having a second transmission speed, and the first transmission speed being higher than the second transmission speed; and
at least one processing unit configured for:
determining the distance between the apparatus and the location based on at least one of a first latency in the transmission and receiving of the first-speed signal and a second latency in the transmission and receiving of the second-speed signal, and a time difference between a time of receiving the first-speed signal transmitted to or from said location and a time of receiving the second-speed signal transmitted to or from said location.

16. A system comprising:
a plurality of target devices forming a mesh network, each for transmitting or receiving at least one set of signals to or from at least one location, the set of signal comprising at least a first-speed signal having a first transmission speed and a second-speed signal having a second transmission speed, and the first transmission speed being higher than the second transmission speed; and
at least one processing unit configured for:
determining the distance between at least one of the plurality of target devices and the at least one location based on a time difference between at least one of a first latency in the transmission and receiving of the first-speed signal and a second latency in the transmission and receiving of the second-speed signal, and a time of receiving the first-speed signal transmitted to or from said location and a time of receiving the second-speed signal transmitted to or from said location.

17. The system of claim 16, wherein each of the plurality of target devices is further configured for:
relaying said determined distance to at least one other target device of the plurality of target devices.

* * * * *